UNITED STATES PATENT OFFICE.

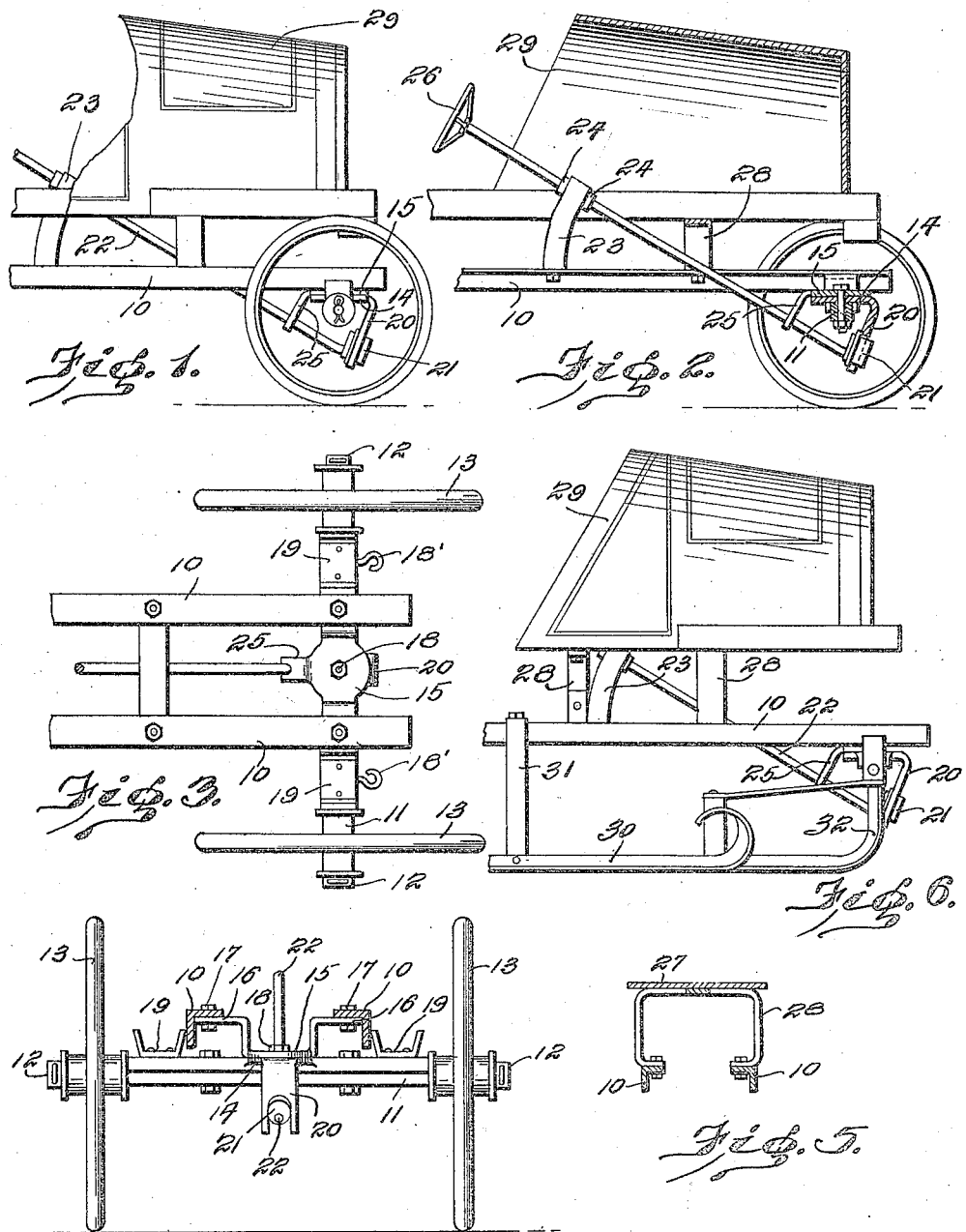

RUDOLPH A. MACK, OF GALLIPOLIS, OHIO.

STEERING MECHANISM.

1,422,284.　　　Specification of Letters Patent.　　Patented July 11, 1922.

Application filed March 10, 1921. Serial No. 451,384.

*To all whom it may concern:*

Be it known that I, RUDOLPH A. MACK, a citizen of the United States, residing at Gallipolis, in the county of Gallia and State of Ohio, have invented new and useful Improvements in Steering Mechanisms, of which the following is a specification.

This invention relates to steering mechanisms for vehicles, and particularly for toy vehicles.

The present application is a division in part of my prior application filed June 26, 1919, Serial No. 306,941.

The object of this invention is to provide a steering mechanism which is simple of construction, reliable and efficient in operation, and well adapted for use upon combination vehicles of that type convertible from one type of vehicle to another through the use of interchangeable parts.

The invention consists of the features of construction, combination and arrangement of parts, hereinafter fully described and claimed, reference being had to the accompanying drawing, in which:—

Figure 1 is a side elevation of a portion of a toy vehicle embodying my invention.

Figure 2 is a vertical longitudinal section of the same.

Figure 3 is a top plan view with parts omitted.

Figure 4 is a vertical transverse section.

Figure 5 is a detail section showing a feature of construction.

Figure 6 is a view showing the application of the invention to a coaster sled.

Referring to the drawing, 10 represents the frame or chassis of the vehicle, comprising a pair of angle bars arranged in spaced and parallel relation, said bars 10 being held rigidly tied and braced in any suitable manner, or by part of the mechanism of the vehicle. In using the device as a wheeled vehicle, rear driving and front steering axles are provided. In this present disclosure, however, I may not deem it necessary to show the rear axle or the driving mechanism, as these constitute no part of the present invention. The front axle 11 is provided with spindles 12 which rotatably support the front or steering wheels 13. This front axle has arranged intermediate its ends and upon its upper side a wear plate constituting a fifth wheel 14, which may be cast with or welded to the axle or may be bolted thereto as desired. This fifth wheel bears against a plate 15 affixed to the forward ends of the spaced bars 10, and this plate may be provided with the end portions or projections 16 to engage beneath the angle bars 10 and to be bolted thereto, as at 17. The plate and its projections thus form a firm support for the fifth wheel of the steering axle and also rigidly maintain the forward ends of the front bars 10 in properly spaced relation. A king bolt 18 passes through alined openings in the fifth wheel 14 and plate 15 to rotatably support the steering axle upon the said plate. The front axle is provided inwardly from its ends with eyes 18' to enable a draft tongue or shafts to be applied to the axle, and the axle is also provided upon its upper surface and adjacent to the eyes with foot plates 19 to enable the occupant of the vehicle to rest his feet and to assist in steering the vehicle.

The steering mechanism is supported by the vehicle frame and is operatively connected with the oscillatable front axle. For the accomplishment of this purpose, the front axle is provided with a forked bearing bracket 20 formed as part of and projected downwardly from the fifth wheel member 14. In this forked bracket is mounted a rotary eccentric head 21, having an eccentrically disposed opening receiving the lower forward end of a steering post 22. The said lower front end of the steering post may be straight or slightly offset or cranked and is fixed to the eccentric head 21, so that the latter will turn or oscillate therewith. The said eccentric head 21 is grooved or flanged for guiding engagement with the forked arms of the bracket 20, so that it will be held from displacement in the latter and yet may turn or oscillate freely therein.

As shown, the eccentric head and lower end of the steering post are arranged below the axle, and the steering post thence extends upwardly and rearwardly at an angle and is rotatably supported upon the vehicle frame by a bearing bracket 23. This bearing bracket 23 comprises a strap iron arranged in the manner shown, the legs of which are bolted to the opposing frame bars 10, whereby the said bracket performs the two-fold function of supporting the steering post and assisting in maintaining the frame bars properly spaced apart. The steering post is provided with collars 24 arranged one upon each side of the supporting bracket of the bearing bracket 23 whereby the post is prevented from moving longitudinally within the bracket. The steering post is prevented from moving laterally near its forward or lower end by a guide bracket 25 preferably formed with and depending from the fifth wheel member 15, said bracket being apertured for the passage of said steering post and to form a bearing opening for the post to turn therein. The upper or rear end of the steering post is provided with the steering wheel 26. It will be understood from the foregoing construction that when the steering post is turned in either direction from a normal or neutral position, in which its lower end is arranged at the lowest point below the center of the eccentric head 21, said head will be turned or oscillated therewith and in its movement in one direction or the other will transmit motion through the forked bracket 20 to the fifth wheel member 14 and axle 11, thus turning the steering wheels 13 for steering motion, a simple form of connection thus being provided between the steering post and the front axle for positively turning the front wheels of the vehicle. If desired, the body portion 27 of the vehicle may be mounted upon the frame bars 10 by inverted U-shaped spring hangers 28 bolted or otherwise secured to said frame bars, and when desired also the front portion of this body may be provided with a hood 29 simulating the hood of an automobile.

Figure 6 of the drawing shows a vehicle similar in many respects to the vehicle shown in Figure 1, a notable distinction being the substitution of sled runners for the driving and steering wheels. Main sled runners, indicated at 30, are secured, as by means of inverted substantially U-shaped strap irons 31 to the frame bars 10, while the front axle has secured thereto the steering runners indicated generally at 32, said steering runners being adjustable for steering movements by the steering mechanism previously described. It is obvious from this construction that the steering mechanism may be employed for operating the steering wheels of a wheeled vehicle or the steering runners of a coaster sled.

Having thus fully described my invention, I claim:

1. In a vehicle of the character described, the combination with a vehicle frame, a fifth wheel member carried by said frame, a bracket projecting rearwardly and downwardly therefrom, an axle pivotally connected to said fifth wheel member, a forked bracket carried by said axle and projecting downwardly therefrom, the brackets of the fifth wheel member and of the axle being alined with each other, a steering post rotatably mounted in said fifth wheel bracket and passing beneath said axle, and an eccentric at the lower end of said steering post engaged in said forked bracket.

2. In a vehicle of the character described, the combination of a vehicle frame, a fifth wheel member carried by said frame, a bracket formed integral with said fifth wheel member and projecting downwardly therefrom, an axle pivoted to said fifth wheel member, a bracket formed integral with said axle and projecting downwardly therefrom substantially alined with the bracket of said fifth wheel member, the said fifth wheel member bracket having an opening therein, the bracket of said axle being forked, a steering post rotatably mounted in the opening in said fifth wheel bracket, and an eccentric at the free end of said steering post fitting into the forked end of the axle bracket.

3. In a vehicle of the character described, the combination with a vehicle frame including spaced parallel bars, a fifth wheel member connecting said bars at their forward ends, a depressed portion intermediate the ends of said fifth wheel member disposed below the plane of said bars, an axle disposed beneath said depressed portion of said fifth wheel member, a bolt passing through said depressed portion and pivotally connecting the axle thereto, a bracket integral with said depressed portion and projecting downwardly therefrom, a forked bracket integral with the said axle intermediate the ends of the latter and projecting downwardly therefrom and substantially alined with the bracket of said fifth wheel member, a steering post rotatably carried by said fifth wheel bracket, and an eccentric at the end of said post engaged in the forked portion of said axle bracket.

In testimony whereof I affix my signature.

RUDOLPH A. MACK.